United States Patent [19]
Naito et al.

[11] Patent Number: 4,791,299
[45] Date of Patent: Dec. 13, 1988

[54] INFRARED RAY SENSING DEVICE

[75] Inventors: Hiroshi Naito, Tokyo; Hidemi Takahashi, Sagamihara; Minoru Kimura; Reiji Sano, both of Kawasaki, all of Japan

[73] Assignee: Agency of Industrial Science and Technology, Tokyo, Japan

[21] Appl. No.: 20,732

[22] Filed: Mar. 2, 1987

[30] Foreign Application Priority Data

Mar. 3, 1986 [JP] Japan .................................. 61-44105

[51] Int. Cl.$^4$ .............................................. G01J 3/00
[52] U.S. Cl. .................................... 250/352; 250/339; 250/341
[58] Field of Search ................... 250/338 R, 341, 339, 250/352

[56] References Cited

U.S. PATENT DOCUMENTS

| 3,614,431 | 10/1971 | Low | 250/341 |
| 3,781,910 | 12/1973 | Herrmann | 250/341 |
| 4,215,273 | 7/1980 | Stokes et al. | 250/352 |

FOREIGN PATENT DOCUMENTS 2602045  7/1977  Fed. Rep. of Germany ...... 250/352

Primary Examiner—Janice A. Howell
Attorney, Agent, or Firm—Lowe, Price, LeBlanc, Becker & Shur

[57] ABSTRACT

A thermally insulating casing accommodates an infrared ray sensing element. The casing has a window which conducts infrared ray to the sensing element. The window is covered with heat absorption gas. An infrared ray emitting element may be accommodated within the casing. The casing may have a second window which passes infrared ray generated by the emitting element. The second window may be covered with the heat absorption gas.

12 Claims, 5 Drawing Sheets

INFRARED RAY SENSING DEVICE

BACKGROUND OF THE INVENTION

This invention relates to an infrared ray sensing device.

Wavelengths of visible rays reside in the range of approximately 350-700 nm. Rays having wavelengths below 350 nm are in an ultraviolet range. Rays having wavelengths above 700 nm are in an infrared range. The ultraviolet and infrared rays are invisible.

Infrared rays in a long wavelength range are radiated as heat. As the wavelength of the infrared ray increases, the related transmissivity rises. For example, infrared rays having large wavelengths can travel for long distances in a fog or smoke.

These characteristics of infrared rays are used in several known image pickup systems which can image an object under dark or foggy conditions. Infrared ray sensors are generally of the heat type and the photon type. In the heat-type sensors, variations in their temperatures which result from thermal energies of incoming infrared rays are detected through changes in a physical parameter or quantity such as resistance or charge quantity. The photon-type sensors directly detect photons of infrared rays. Some of the heat-type sensors use pyroelectric sensing elements dispensing with cooling, and typically include a film of polyvinylidene fluoride ($PVF_2$), a thin plate of a single crystal of triglycinium sulphate (TGS), triglycinium fluoroberyllate (TGFB), deuterium triglycinium fluoride (DTGS), deuterium triglycinium fluoroberyllate (DTGFB), or a ceramic of lead titanate ($PbTiO_3$). The photon-type sensors have semiconductor sensing elements including a substance such as silicon (Si), indium antimony (InSb), or mercury cadmium tellurium (HgCdTe).

Image detectors using infrared ray sensors are generally of three types, that is, a mechanical scanning type, a solid scanning type, and an electron beam scanning type. A thermography is a typical image detector of the mechanical scanning type. A monolithic camera device including infrared ray sensors on charge coupled devices (CCD) is a typical image detector of the solid scanning type. A pyroelectric camera tube is a typical image detector of the electron beam scanning type. All of these image detectors operate in a passive manner such that an object is imaged on the detectors through infrared rays emitted from the object and then the image is converted into an electric signal. The passive-type image detectors cannot sense an object when the object does not emit any infrared rays.

In addition, there are active-type detecting systems which operate in a manner such that infrared rays are positively applied to an object and the object is detected through the infrared rays reflected by the object.

Recently, there is an increasing need to image an object under dark conditions and to grasp the situation in various calamities and disasters. It has been proposed and studied that an infrared ray sensing device is used in detecting a firing point, grasping the situation of damages to objects and facilities in flames, and grasping the situation of peripheries for saving lives. Conventional infrared ray sensing devices are unsatisfactory from the standpoint of heatproof characteristics. Specifically, the conventional infrared ray sensing devices can not operate normally when they are close to flames having temperatures of one thousand and several hundred degrees of Celsius.

Generally, the wavelength distribution of energies radiated from surfaces of a black body, the wavelength of the maximal radiation quantity, and the total radiated energies depend on the temperature of the black body in accordance with well-known Planck's law of radiation, Wien's displacement law, and Stefan-Boltzmann's law, respectively.

FIG. 6 shows the wavelength distribution of energies radiated from a black body at various temperatures. It is understood from FIG. 6 that the place of a fire radiates infrared rays in a wide range of wavelengths and that temperatures of peripheries of the fire place are much increased by radiated heats. Conventional infrared ray sensing devices can operate normally at temperatures below approximately 70° C. Accordingly, the conventional sensing devices cannot be used in or near the place of a fire if they have no heat protection.

SUMMARY OF THE INVENTION

It is an object of this invention to provide an infrared ray sensing device which has adequate heatproof characteristics.

In accordance with an infrared ray sensing device of this invention, a thermally insulating casing accommodates an infrared ray sensing element. The casing has a window which conducts infrared ray to the sensing element. The window is covered with heat absorption gas. An infrared ray emitting element may be accommodated within the casing. The casing may have a second window which passes infrared rays generated by the emitting element. The second window may be covered with the heat absorption gas.

BRIEF DESCRIPTION OF THE DRAWINGS

Like and corresponding elements are denoted by the same reference characters throughout the drawings.

DESCRIPTION OF THE PREFERRED EMBODIMENTS

Figure 1:
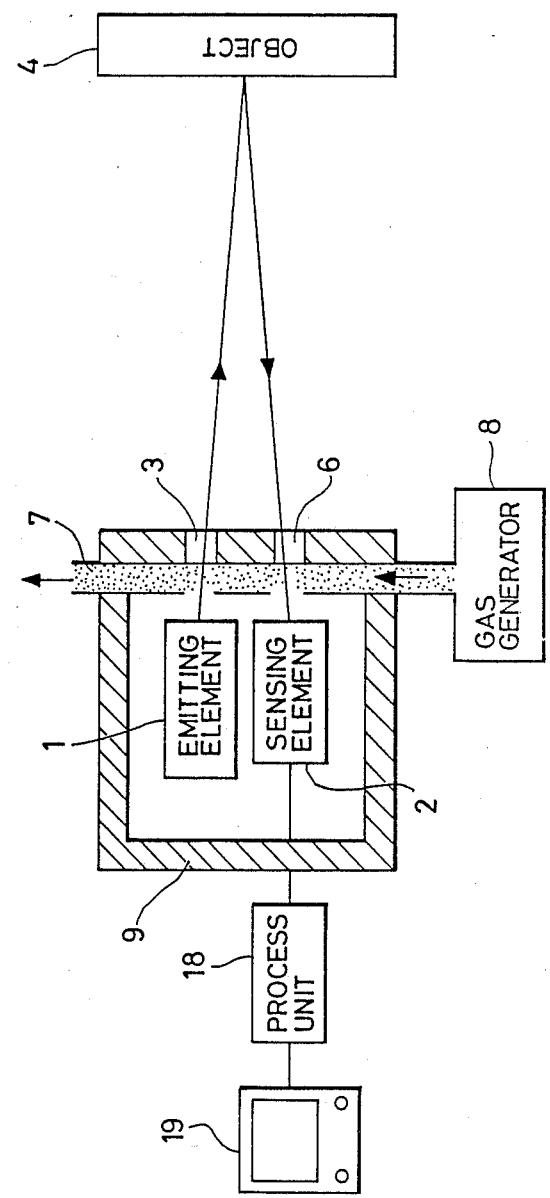
FIG. 1 is a diagram of an infrared ray image or object detecting system including an infrared ray sensing device according to a first embodiment of this invention.

With reference to FIG. 1, an infrared ray image or object detecting system includes an infrared ray emitting element 1 and an infrared ray sensing element 2. The emitting element 1 and the sensing element 2 are accommodated or disposed within a casing 9 having walls made of thermally insulating material. The thermally insulating casing 9 prevents the transmission of heat to the emitting element 1 and the sensing element 2 from high temperature environments. In other words, the thermally insulating casing 9 protects the elements 1 and 2 from heat. Infrared rays generated by the emitting element 1 travel to an object 4 through an emission or output window 3 formed in one of the walls of the casing 9. The infrared rays reflected by the object 4 travel to the sensing element 2 through a receipt or input window 6 defined in the casing walls. The sensing element 2 converts the received infrared rays into an electric signal. A conventional signal processing unit 18 electrically connected to the sensing element 2 receives the electric signal from the sensing element 2. The unit 18 processes the received signal in accordance with the distance between the emitting element 1 and the object 4, the distance between the object 4 and the sensing element 2; and the shape of the object 4 in a known manner. In this way, the signal processing unit 18 derives a final signal from the signal outputted by the sensing element 2. It should be noted that the signal processing unit 18 may be disposed within the casing 9. A display 19, such as a cathode ray tube display or a television dislay connected to the signal processing unit 18, receives the signal from the unit 18. The display 19 indicates an image or characters in accordance with the signal outputted by the signal processing unit 18.

A gas generator or gas supply device 8 has an outlet connected to a duct 7 extending through the casing 9. The duct 7 extends along the inner surfaces of the casing walls defining the windows 3 and 6. The duct 7 extends between the emitting element 1 and the output window 3, and between the sensing element 2 and the input window 6. The duct 7 has a first opening essentially in alignment with the outlet window 3 and the emitting element 1. The infrared rays generated by the emitting element 1 travel to the object 4 through the first opening of the duct 7 and the output window 3. The duct 7 has a second opening essentially in alignment with the input window 6 and the sensing element 2. The infrared rays reflected by the object 4 travel to the sensing element 2 through the input window 6 and the second opening of the duct 7. The gas generator 8 discharges heat absorption gas into the duct 7. The heat absorption gas flows through the duct 7. The first and second openings of the duct 7 are designed so that the heat absorption gas flowing in the duct 7 will cover or overspread the windows 3 and 6 and that the heat absorption gas will flow across inner ends of the windows 3 and 6. Accordingly, the heat absorption gas prevents the admission of heat into essential part of the casing through the windows 3 and 6 and thereby protects the emitting element 1 and the sensing element 2 from heat. The heat absporption gas is chosen so as to conduct the infrared rays generated by the emitting element 2 and detected by the sensing element 2. The heat absorption gas preferably includes carbonic acid gas (carbon dioxide), water vapor, or a mixture of carbonic acid gas and water vapor. It should be noted that the gas generator 8 may be disposed within the casing 9.

Figure 2:
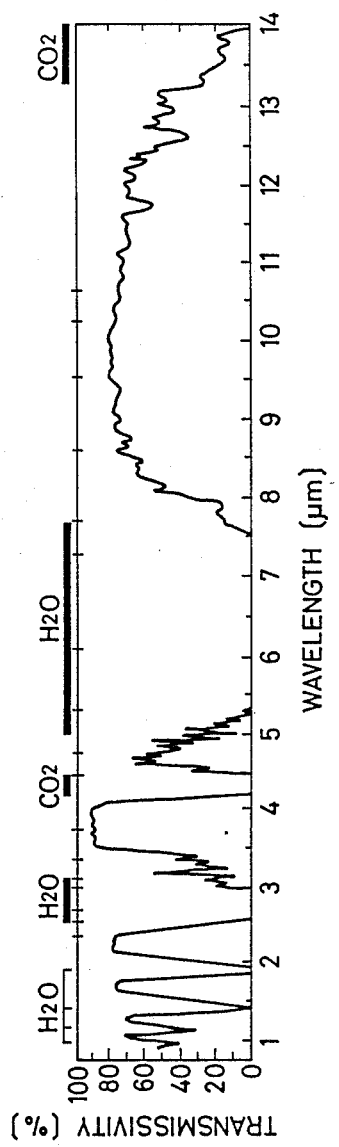
FIG. 2 is a diagram of the relationship between light transmissivity and light wavelength in atmosphere.

Atmosphere contains various gases such as nitrogen gas, oxygen gas, carbonic acid gas, and water vapor. The contained rates between these gases are essentially constant. FIG. 2 shows the relationship between the light transmissivity of atmosphere and the light wavelength in the range of 1 $\mu$m to 14 $\mu$m. As is understood from FIG. 2, there are several particular wavelength ranges called windows of atmosphere. A typical window of atmosphere extends in the wavelength range of 3.5–4.2 $\mu$m. Another typical window of atmosphere extends in the wavelength range of 8.3–13.3 $\mu$m. On the other hand, there are several wavelength ranges where lights are extremely absorbed by atmosphere and hardly pass through atmosphere. For example, infrared rays in the wavelength range of 2.5–3.2 $\mu$m and in the wavelength range of 5.2–7.6 $\mu$m are extremely absorbed by water or water vapor in atmosphere. Infrared rays in the wavelengh range of 4.2–4.5 $\mu$m and in the wavelength range of 13.5–14.0 $\mu$m are extremely absorbed by carbonic acid gas in atmosphere.

This invention uses the selective infrared ray absorption charcteristics of carbonic acid gas and water vapor in order to allow free transmission of infrared ray of a particular wavelength while absorbing infrared rays of other wavelengths. As will be made clear hereinafter, this selective free transmission and absorption of infrared rays protects the emitting element 1 and sensing element 2 from heat while maintaining normal operations of the elements 1 and 2.

The emitting element 1 is preferable designed to generate infrared ray having a wavelength in the range of 8 $\mu$m to 14 $\mu$m. The sensing element 2 is preferably designed to essentially sense only infrared ray having a wavelength in the range of 8 $\mu$m to 14 $\mu$m.

In more detail, the emitting element 1 preferably includes a carbonic acid gas ($CO_2$) laser generating infrared ray having wavelength of 10.6 $\mu$m. As is understood from FIG. 2, the thermally insulating gas including carbonic acid gas, water vapor, or a combination of carbonic acid gas and water vapor, is easily pervious to infrared ray having a wavelength of 10.6 $\mu$m. Accordingly, this infrared ray freely travels from the emitting element 1 to the output window 3 and also travels from the input window 6 to the sensing element 2. The sensing element 2 preferebly includes a semiconductor compound of mercury, cadmium, and tellurium (HgCdTe).

As is understood from FIG. 2, the heat absorption gas absorbs infrared rays of wavelengths other than 10.6 $\mu$m and thus absorbs heat related to these infrared rays. Accordingly, when heat related to these infrared rays enters the casing 9 through the windows 3 and 6, the heat is absorbed by the heat absorption gas and is moved out of the casing 9 by the gas. Furthermore, the gas generator 8 continuously supplies cool heat absorption gas, so that heat admitted into the casing through the windows 3 and 6 are moved out of the casing by the cool gas. In this way, the emitting element 1 and the sensing element 2 are essentially completely protected from heat generally radiated from the place of a fire or high temperature environments.

Figure 3:
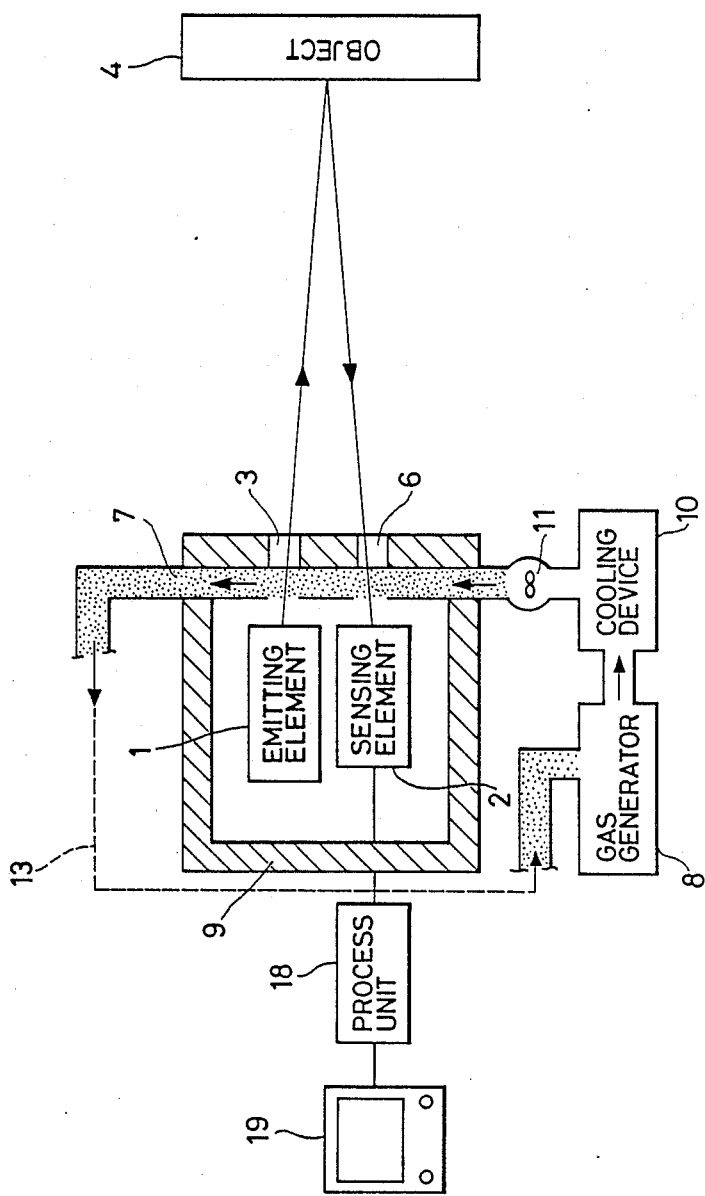
FIG. 3 is a diagram of an infrared ray image or object detecting system includiong an infrared ray sensing device according to a second embodiment of this invention.

FIG. 3 shows a second embodiment of this invention which is similar to the embodiment of FIG. 1 except for design changes as follows.

A series combination of a cooling device 10 and a fan 11 is connected between an outlet of the gas generator 8 and one end of the duct 7. The other end of the duct 7 is connected to an inlet of the gas generator 8 via a pipe 13. Heat absorption gas moves from the gas generator 8 into the cooling device 10. The gas is cooled by this device 10. Then, the gas is driven from the cooling device 10 to the duct 7. After the gas passes through the duct 7, the gas returns to the gas generator 8 via the pipe 13. In this way, the heat absorption gas is circulated and cooled.

Figure 4:
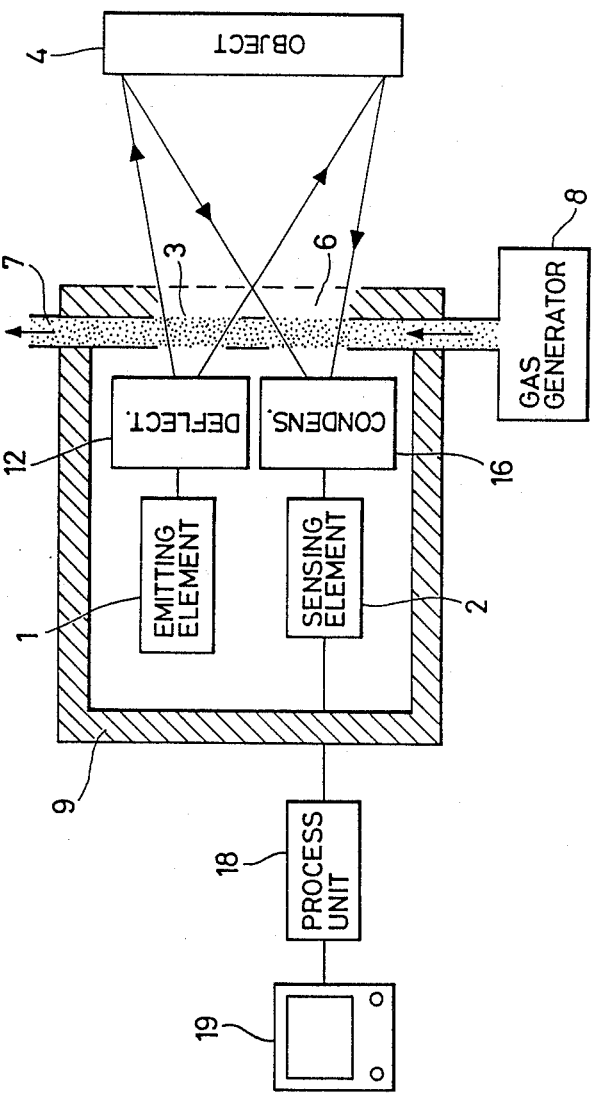
FIG. 4 is a diagram of an infrared ray image detecting system including an infrared ray sensing device according to a third embodiment of this invention.

FIG. 4 shows a third embodiment of this invention which is similar to the embodiment of FIG. 1 except for design changes as follows.

As shown in FIG. 4, a conventional scannable deflector 12 disposed within the casing 9 resides between the emitting element 1 and the duct 7. The infrared ray generated by the emitting element 1 moves into the first opening of the duct 7 and the output window 3 through the deflector 12. The deflector 12 scans the infrared ray at a preset period and converts its form into a two dimensional form in a conventional way.

A conventional condenser 16 disposed within the casing 9 resides between the sensing element 2 and the duct 7. After passing through the input window 6 and the second opening of the duct 7, the infrared ray reflected by the object 4 moves into the sensing element 2 through the condenser 16. The condenser 16 concentrates the infrared ray on the sensing element 2 in a conventional way.

Figure 5:
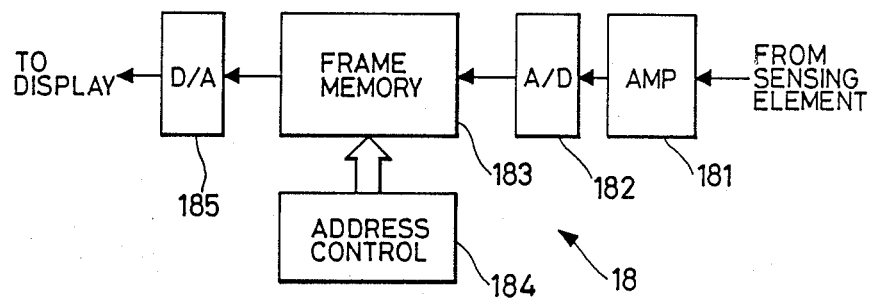
FIG. 5 is a block diagram of the signal processing unit of FIG. 4.
Figure 6:
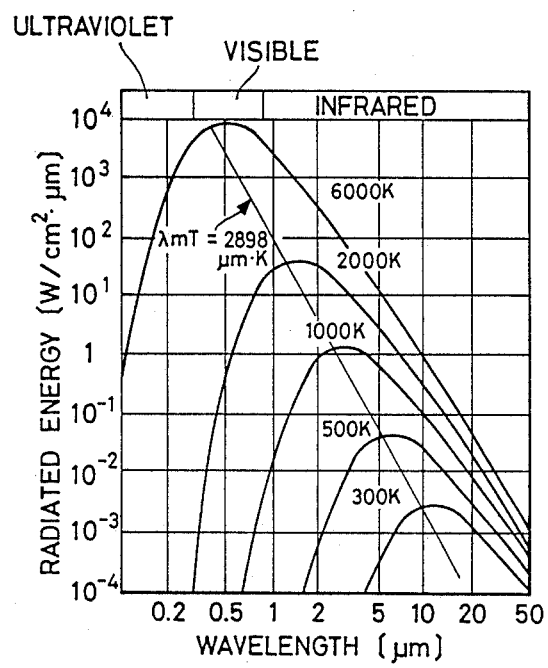
FIG. 6 is a diagram of the relationship between light energy and light wavelength in black body radiation.

As shown in FIG. 5, the signal processing unit 18 includes an amplifier 181, an analog-to-digital (A/D) converter 182, a frame memory 183, an address control circuit 184, and a digital-to-analog (D/A) converter 185. The signal outputted by the sensing element 2 is transmitted to the A/D converter 182 via the amplifier 181. The device 182 converts the received analog signal into a corresponding digital signal. The digital signal outputted by the A/D converter 182 is applied to the frame memory 183. The address control circuit 184 preferably receives a synchronous signal from the deflector 12. This synchronous signal corresponds to the scanning operation of the deflector 12. The address control circuit 184 allows the digital signal from the A/D converter 182 to be stored in the segment of the frame memory 183 denoted by an address determined in accordance with the synchronous signal. In this way, the digital signals from the A/D converter 182 are stored in the segments of the frame memory 183 in synchronism with the scanning operation of the deflector 12.

The address control circuit 184 also receives a synchronous signal from the television display 19. This synchronous signal corresponds to the scanning operation of the television display 19. The address control circuit 184 allows the digital signal, stored in the segment of the frame memory 183 denoted by an address determined in accordance with the synchronous signal, to be read and transmitted to the D/A converter 185. In this way, the digital signals stored in the segments of the frame memory 184 are read and transmitted to the D/A converter 185 in synchronism with the scanning operation of the television display 19. The device 185 converts the received digital signal into a video signal applied to the television display 19. The television display 19 indicates an image of the object 4 through the video signal outputted by the D/A converter 185. It should be noted that the address control circuit 184 may include a microprocessing unit.

What is claimed:

1. An infrared ray sensing device comprising:
   (a) an infrared ray sensing element;
   (b) a thermally insulating casing accommodating the sensing element and having a window which conducts infrared rays of predetermined wavelength to the sensing element; and
   (c) means for flowing heat absorption gas so as to cover the window therewith;
   wherein the heat absorption gas essentially passes infrared rays of the predetermined wavelength to be detected by the sensing element and absorbs infrared rays of other wavelengths.

2. An infrared ray sensing device comprising:
   (a) an infrared ray sensing element;
   (b) a thermally insulating casing accommodating the sensing element and having a window which conducts infrared rays to the sensing element; and
   (c) means for covering the window with heat absorption gas further comprising an infrared ray emitting element, a second window formed through the casing and conducting infrared rays generated by the emitting element, and means for covering the second window with the heat absorption gas.

3. The device of claim 2 wherein the infrared rays generated by the emitting element have a wavelength in the range of approximately 8 $\mu$m to 14 $\mu$m.

4. The device of claim 2 wherein the sensing element essentially senses only infrared rays having a wavelength in the range of 8 $\mu$m to 14 $\mu$m.

5. The device of claim 2 wherein the emitting element comprises a carbonic acid gas ($CO_2$) laser.

6. The device of claim 2 wherein the sensing element comprises a semiconductor compound of mercury, cadminum, and tellurium (HgCdTe).

7. The device of claim 1 wherein the heat absorption gas comprises carbonic acid gas.

8. The device of claim 1 wherein the heat absorption gas comprises a mixture of carbonic acid gas and water vapor.

9. The device of claim 1 wherein the heat absorption gas comprises water vapor.

10. An infrared ray sensing device comprising:
    (a) an infrared ray sensing element;
    (b) a thermally insulating casing accommodating the sensing element and having a window which conducts infrared rays of predetermined wavelength to the sensing element;
    (c) means for circulating and flowing heat absorption gas so as to cover the window therewith; and
    (d) means for cooling the heat absorption gas;
    wherein the heat absorption gas essentially passes infrared rays of the predetermined wavelength to be detected by the sensing element and absorbs infrared rays of other wavelengths.

11. An infrared ray sensing device comprising:
    (a) an infrared ray sensing element;
    (b) a thermally insulating casing accommodating the sensing element and having a window which conducts infrared rays to the sensing element;
    (c) means for flowing heat absorption gas so as to cover the window therewith;
    wherein the heat absorption gas passes infrared rays of a wavelength of a carbonic acid gas laser and absorbs infrared rays of a wavelength different from said wavelength of the carbonic acid gas laser, and wherein the sensing element senses infrared rays of the wavelength of the carbonic acid gas laser.

12. An infrared ray sensing device comprising:
    (a) an infrared ray sensing element;
    (b) a thermally insulating casing accommodating the sensing element and having a window which conducts infrared rays to the sensing element;
    (c) means for covering the window with heat absorption gas;
    wherein the heat absorption gas passes infrared rays of a wavelength in a first range and absorbs infrared rays of a wavelength in a second range different from the first range, and wherein the sensing element senses infrared rays having a wavelength in the first range, further comprising an infrared ray emitting element, a second window formed through the casing and conducting infrared rays generated by the emitting element, and means for covering the second window with the heat absorption gas, and wherein the infrared rays generated by the emitting element have a wavelength in the first range.

* * * * *